INVENTORS.
ALBERT L. RENKEY &
PETER T. TROELL
BY
William C. Nealon
ATTORNEY

Aug. 27, 1968 A. L. RENKEY ET AL 3,399,267
INDUCTION FURNACE
Filed Aug. 15, 1966 3 Sheets-Sheet 3

INVENTORS.
ALBERT L. RENKEY &
PETER T. TROELL
BY
William C. Nealon
ATTORNEY

United States Patent Office 3,399,267
Patented Aug. 27, 1968

3,399,267
INDUCTION FURNACE
Albert L. Renkey and Peter T. Troell, Pittsburgh, Pa., assignors to Dresser Industries, Inc., Dallas, Tex., a corporation of Delaware
Filed Aug. 15, 1966, Ser. No. 572,563
6 Claims. (Cl. 13—30)

ABSTRACT OF THE DISCLOSURE

This invention pertains to refractory linings for large barrel-type channel induction furnaces, particularly composite refractory linings; the brickwork of which will remain in place when the throat lining wears away or is periodically replaced.

BACKGROUND

Channel induction furnaces are used throughout the ferrous and nonferrous metals industries for melting and holding hot metals. They are used primarily in foundries because of the close temperature control they provide and the need for such control in foundry casting. Furthermore, they are extremely economical as their electrical efficiency approaches 97%; and, among other advantages, they operate directly from standard frequency power lines.

Channel induction furnaces vary in size from less than 5 tons capacity to greater than 150 tons capacity. This invention is directed to the larger furnaces; that is, those over 15 to 25 tons capacity. These larger furnaces are found mostly in iron foundries and only occasionally are used for melting nonferrous metals. Presently, induction furnaces are seldom used for melting steel, which melts at a temperature higher than iron or nonferrous metals. However, it is being considered because of the many advantages channel induction furnaces provide. The use of large channel induction furnaces is relatively new even in iron foundries having only been introduced in the last several years.

The basic design for most channel induction furnaces comprises a hearth for holding the hot metal and at least one inductor block. The inductor blocks vary in design, some being known as single-core and others as double-core inductor blocks. The single-core inductor block is the simplest and comprises an iron core surrounded by a primary coil which, in turn, is surrounded by a molten metal loop in a secondary channel formed of refractory. All core-type induction furnaces are analogous to a simple transformer with a short-circuited secondary coil. Heat is generated by the secondary current flowing in the channel area, and electromagnetic stirring quickly distributes it throughout the induction furnace.

This invention is directed towards the hearth portion of a channel induction furnace and, particularly, to those having barrel-shaped hearths. These hearths have a generally cylindrical wall and two endwalls generally perpendicular to the cylindrical axis about which the whole furnace rotates. On the cylindrical wall, there is at least one door for charging scrap and removing slag. Generally opposite the charging door in the cylindrical wall there is at least one opening or throat. The inductor blocks are releasably attached to the cylindrical wall in communication with the throat. Regardless of how many inductor blocks and charging doors are used, at least one charging door and one inductor block are positioned so that hot metal can be poured directly into an inductor block. This is necessary to start up a cold furnace. Spouts for charging and removing hot metals are usually joined to the endwalls of the hearth. The walls of the hearth consist of an outer metal shell which is lined with refractory brick and monolithic materials.

The rate at which refractories are consumed in an induction furnace hearth depends on the particular metal being heated and the location of the refractories in the furnace. Bronze and zinc melts are not especially severe and are adequately contained by fireclay brick. Iron (viz. gray iron and nodular iron) and steel melts are more severe as they are held at about 2900° F. prior to casting.

In all furnaces of which we are aware, the inductor block linings receive severe wear. This is because the temperatures are higher in the inductor blocks than elsewhere, and metal is continuously drawn through the restricted inductor channel tending to erode or wash away the refractory surfaces. For this reason, inductor blocks are releasably attached to the hearths so they can periodically be removed and relined. One barrel-type induction furnace is designed so that the inductor block can be removed without even cooling the furnace.

In the hearth of an induction furnace there are several severe wear areas. The area adjoining the inductor blocks, referred to as the throats, are often consumed before the rest of the hearth. For the same reasons the inductor blocks are rapidly consumed.

Generally, slag is present on top of the melt within the hearth. It may be introduced when the hot metal is transferred from an iron-melting cupola in which case it is usually very siliceous and, therefore, chemically acid. On the other hand, it may be formed in the hearth due to oxidation of the melt. In this case, it will be high in FeO and MnO and chemically basic. Slag causes the refractories at the metal line (slag line) to be consumed more rapidly, and would be considered a severe wear area. This is generally because liquid metals poorly wet oxide refractories; whereas slags, which are molten oxides, more easily wet and thereby penetrate and dissolve refractories. Another trouble spot, the frames surrounding the charging doors, are subjected to mechanical abrasion and repeated changes in temperature.

In the past, when mostly smaller barrel-type induction furnaces were used, substantially all were lined with monolithic refractory materials. Monolithic linings, while easily installed, are much less resistant to the washing action of molten metals and the attack of corrosive slags. However, it was not previously considered practical to install brick linings because of the large amount of cutting and fitting necessary and because as the throat area wore away the rest of the furnace lining tended to shift and loosen. As a result, when the furnace was shut-down for repair of the throat area, the whole lining would usually have to be replaced. The throat lining which had been reduced in service could not retain the brickwork in place. Consequently, a considerable amount of unworn brick was tossed out at every repair. For larger furnaces, those in excess of about 20 tons capacity, monolithic linings are not sufficiently reliable. Occasionally, large chunks float out requiring that a large quantity of hot metal be quickly removed from the furnace. Therefore, it was necessary to find a way to use brick linings in large induction furnaces.

According to this invention, it is possible to line a large barrel-type induction furnace with brick such that, as the throat area is worn away or periodically replaced, the rest of the lining remains snugly in place. Furthermore, because of the ease with which composite brick linings can be constructed as compared to composite monolithic linings, it is possible to provide a balanced lining. By balanced lining, we mean one in which various types of brick are used in different areas according to the type and severity of the wear in an area whereby the whole lining tends to be consumed at a uniform rate, or at least those areas most severely worn may be periodically replaced without damage to the rest of the lining. Balanced linings provide the most economical use of refractory brick.

BRIEF DESCRIPTION OF THE INVENTION

According to one aspect of this invention, a refractories lining is provided for a barrel-shaped channel induction furnace of the type having a generally cylindrical metal shell and two endwalls, at least one opening in the shell for charging, and at least one throat opening to an inductor block generally opposite the charging door. The charging doors are framed by two flat arches substantially parallel to the longitudinal axis of the cylindrical shell and two curved arches which are substantially parallel to each other and disposed circumferentially. The arches are made of a plurality of special shapes keyed so that the four arches cannot move toward the longitudinal axis or toward the opening. Adjacent and above the throat opening are two throat arches substantially parallel to the longitudinal axis of the induction furnace. The throat arches are keyed so that they cannot move toward the longitudinal axis, nor can they move circumferentially toward each other in the throat. The longitudinal extent of the throat arches is longer than the longitudinal extent of the throat. The remainder of the lining adjacent the metal shell is usually comprised of multiple layers of refractory brick selected to provide a balanced lining. It is snugly keyed against the throat arches and the four arches which frame the charging door, whereby all of the brickwork in the cylindrical walls remain in place as the hearth is rotated through 360°.

It is an essential feature of this invention that the refractories used have almost no tendency for compressive creep at operating temperatures. Suitable refractories are discussed in the detailed description. The endwalls can be bricked with straights, as it is not necessary for these walls to be keyed. The throat can be lined with a monolithic refractory material.

DETAILED DESCRIPTION

Further features and other objects and advantages of this invention will become clear to those skilled in the art by a study of the following detailed description with reference to the drawings, in which.

Figure 1:
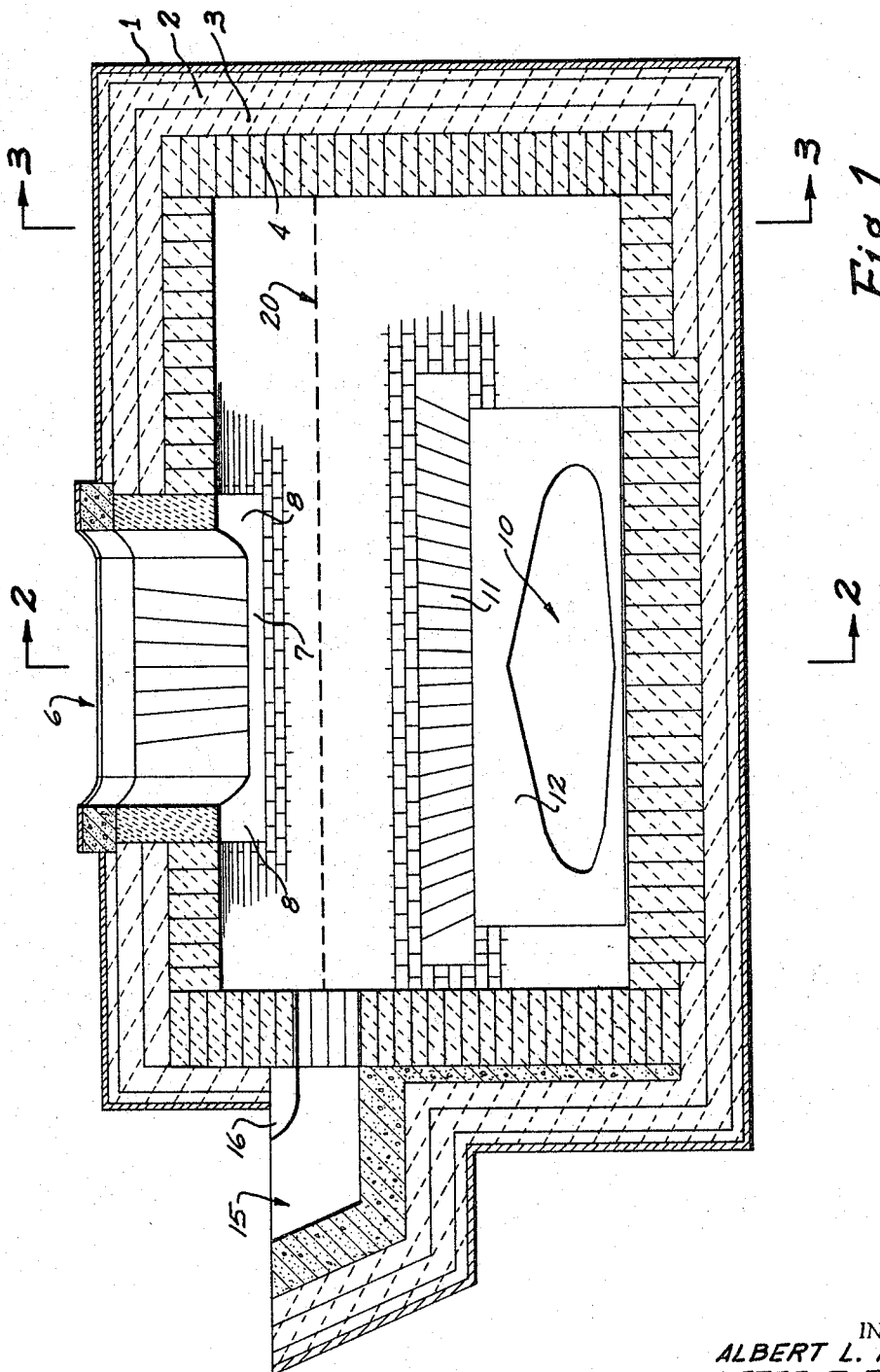
FIG. 1 is a front section through the hearth of a barrel-type channel induction furnace.
Figure 2:
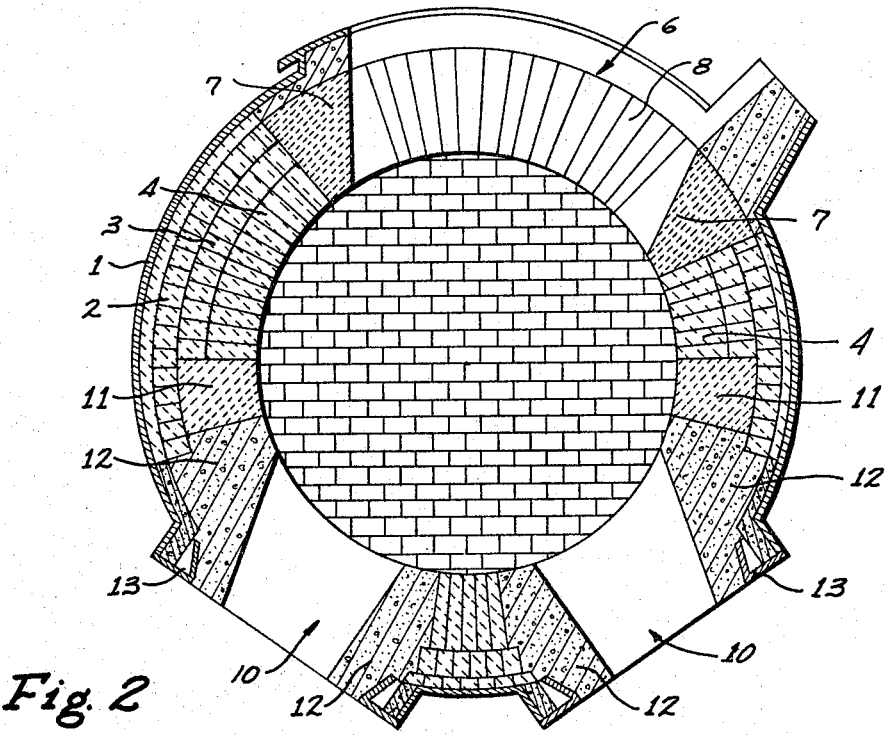
FIG. 2 is an end section through the barrel-type channel induction furnace taken along lines 2—2 in FIG. 1.
Figure 3:
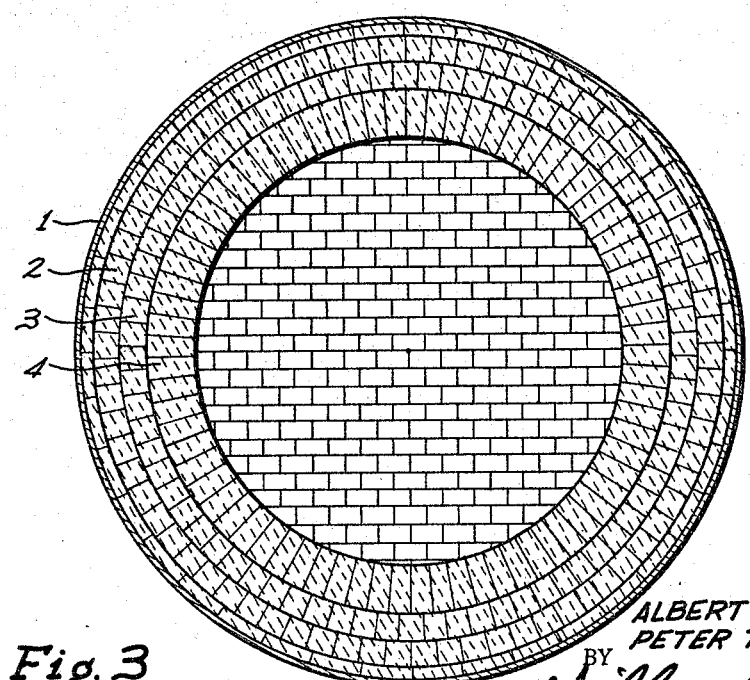
FIG. 3 is an end section through the barrel-type channel induction furnace taken along lines 3—3 in FIG. 1.

Referring now to the drawings, the hearth of the barrel-type channel induction furnace is contained in an outer metal shell 1, which is generally cylindrical. Adjacent the outer metal shell is an insulating refractory lining 2 and a backup lining of fireclay or high alumina brick 3. The working lining 4 is adjacent the interior of the furnace. These linings are fabricated from standard straight, wedged, and arched brick. A description of standard brick sizes and shapes, such as keys, wedges, straight, and arches, is contained in Modern Refractory Practice, 4th edition, published by Harbison-Walker Refractories Company, at pp. 477 et seq. The same reference includes an explanation and tables for calculating the combination of shapes that must be used in the construction of circular linings of various diameters, at pp. 536 et seq. This publication is incorporated herein by reference.

Figure 4:
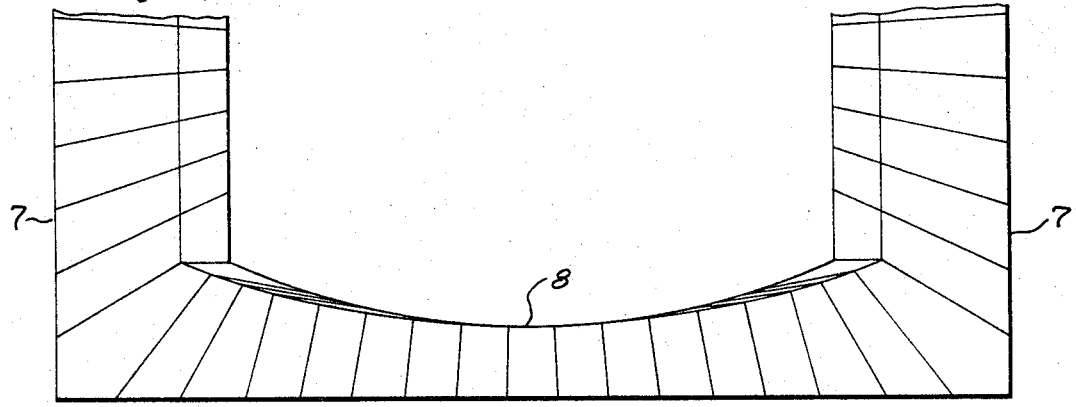
FIG. 4 is a top view of one-half of the charging door frame cmprising two flat arches and two curved arches.
Figure 5:
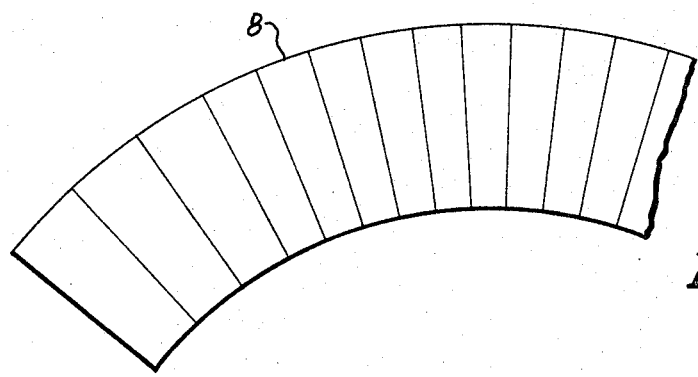
FIG. 5 is an end view of the charge door frame shown in FIG. 4.

There is a charging door and slag-removing door 6 located in the cylindrical wall of the hearth. The charging door is framed by two flat arches 7 and two curved arches 8, which are fabricated from a plurality of special shapes which are keyed so that they cannot move toward the longitudinal axis of the cylinder nor toward each other. FIGS. 4 and 5 are detailed drawings showing the construction of the charge door frame assembly including the two flat arches and the two curved arches.

Figure 6:
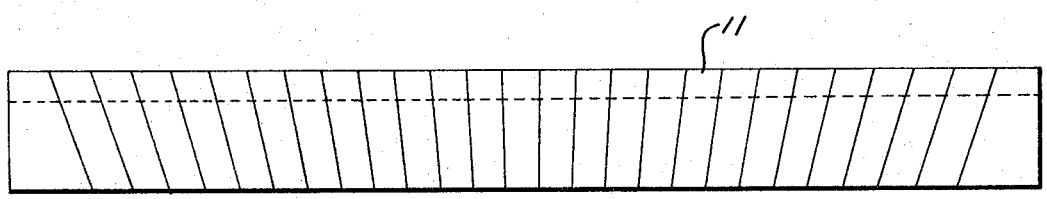
FIG. 6 is a front view of a flat arch used to maintain the throat, viz. throat arch.
Figure 7:
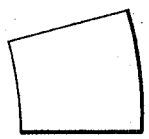
FIG. 7 is an end view of the flat arch used to maintain the throat, viz. throat arch.

There is a throat 10 generally opposite the charging door which is maintained by a flat throat arch 11 and is lined with monolithic refractory 12. FIGS. 6 and 7 are detailed drawings showing the construction of the throat arch. The shell of the hearth is arranged so that the inductor block can be attached to the hearth covering the throat area 10. The inductor block is fastened to the shell at points 13. There is an opening 14 in a sidewall for permitting the introduction and discharge of hot metal to the vessel. Generally, some form of a spout 15 is provided which is lined with a monolithic refractory 16.

In linings according to the teachings of this invention, in which all the brickwork is in the cylindrical walls keyed and maintained by the charge door assembly and the throat arch, the brickwork does not tend to shift and separate on cooling or after the throat area is worn away or repaired. The throat area can be periodically replaced without replacing the brick lining and, therefore, balanced brick linings can be considered.

It is desirable, according to this invention, that the arches that maintain the charging door on the throats are comprised of high-strength, ceramically-bonded, alumina shapes. The working lining (the portion of the lining adjacent the interior of the furnace) is made from low-porosity high alumina brick. The throat area comprises a high alumina monolithic material. It is possible to line the throat with brick. However, this either requires a large number of specially made shapes or many hours of tedious cutting and fitting. Because monoliths can be shaped in place, and because, when this invention is practiced, the throat linings can be removed and replaced without damage to the remainder of the furnace lining, monoliths such as ramming mixes are used in the throat area. In furnaces in which a large amount of basic slag is allowed to enter or be generated in the furnace, it is desirable that the working lining at the slag line 20 is ceramically bonded basic brick.

Suitable high alumina refractory brick for use in this invention are classified and described in the Manual of A.S.T.M. Standards on Refractory Materials, 9th edition, p. 30, under ASTM Designation C27–60. Basic refractories suitable for use in this invention include, among others, those described in the reference cited immediately above at p. 28 under ASTM Designation C455–62.

It is preferable according to this invention (especially for iron and steel melting furnaces) that the arches which maintain the charging door and throats are comprised of ceramically bonded synthetic alumina shapes, and that the working lining below the slag line is also comprised of ceramically bonded synthetic alumina brick. The working lining above the slag line is preferably comprised of burned, phosphate-bonded, high alumina brick, and the throat area lined with a synthetic alumina monolithic material. Where the slag attack by a basic slag is exceptionally severe, it is preferable that the working lining at the slag line be comprised of ceramically bonded basic refractory brick.

Examples of suitable ceramically bonded, synthetic, alumina shapes are disclosed in U.S. Patent Nos. 3,067,050 and 3,192,058, assigned to the same assignee as the present case. For induction furnaces extensively used for melting steel, the working lining should be comprised of all basic brick. The shapes in the arches which frame the charging doors and throat arches should be direct-bonded magnesite-chrome brick, direct-bonded chrome-magnesite brick and brick made from fused magnesite and chrome ore grain. Examples of suitable direct-bonded brick are disclosed in U.S. Patent No. 3,180,745. Examples of suitable brick made from fused magnesite-chrome ore grain are disclosed in U.S. Patent No. 3,116,158.

Having thus described the invention in detail and with sufficient particularity as to enable those skilled in the are to practice it, what is desired to have protected by Letters Patent is set forth in the following claims:

We claim:

1. In a rotatably-mounted barrel-shaped channel induction furnace of the type having a generally cylindrical metal shell closed by endwalls, a refractory lining adjacent the shell, at least one charging door passing through the shell, at least one inductor block throat opening through the shell substantially opposite said charging door, the improvement comprising said charging door being framed by two substantially parallel flat arches disposed along the longitudinal axis of the furnace and two substantially parallel curved arches disposed circumferentially, said flat and curved arches being composed of a plurality of refractory shapes which are keyed to preclude movement toward the furnace interior and charging door, said throat opening being defined by a refractory lining, a throat arch disposed adjacent and above said throat along the longitudinal axis of the furnace adjacent said metal shell and contiguous with said throat lining, the longitudinal extent of said throat arch being greater than the longitudinal extent of said throat opening, said throat arch being composed of a plurality of refractory shapes which are keyed to prevent movement toward the furnace interior and throat lining, the remainder of said refractory lining adjacent the metal shell comprising multiple layers of refractory brick selected to provide a balanced lining which brick have substantially complete resistance to compressive creep at operating temperatures of the furnace, such that the brickwork adjacent the shell remains in place when the throat lining wears away or is periodically replaced.

2. A channel induction furnace according to claim 1 in which the refractory shapes in the arches which frame the charging door and in the throat arches are comprised of high-strength, ceramically bonded, alumina refractory shapes, the throat lining is comprised of high alumina refractory monolithic material, and the remainder of the refractory lining adjacent the interior of the furnace is composed of a brick selected from the group consisting of low porosity fireclay and high alumina brick.

3. A channel induction furnace according to claim 2 having a slag line, said slag line being lined with ceramically bonded basic brick.

4. In a channel induction furnace according to claim 1 having a slag line the refractory shapes in the arches which maintain the charging door and the throat arches being comprised of ceramically bonded synthetic alumina shapes, the throat lining being composed of a synthetic alumina monolithic material the remainder of the refractory lining adjacent the interior of the furnace above the slag line being comprised of burned phosphate-bonded alumina brick and below the slag lining being ceramically bonded synthetic alumina brick.

5. A channel induction furnace according to claim 4 in which the lining at the slag line comprises ceramically bonded basic refractory brick.

6. A channel induction furnace according to claim 1 in which the refractory shapes in the arches which frame the charging doors and in the throat arches are selected from the group consisting of direct-bonded magnesite-chrome brick, direct-bonded chrome-magnesite brick, and brick made from fused grain containing magnesite and chrome ore, the remainder of the lining adjacent the furnace interior being comprised of basic refractory brick.

References Cited

UNITED STATES PATENTS

| 2,499,541 | 3/1950 | Tama | 13—29 |
| 3,173,982 | 3/1965 | Coley | 13—29 |

JAMES W. WESTHAVER, *Primary Examiner.*